United States Patent
Wang et al.

(10) Patent No.: US 10,866,662 B2
(45) Date of Patent: Dec. 15, 2020

(54) TOUCH DISPLAY APPARATUS AND METHOD FOR TOUCH DISPLAY PANEL

(71) Applicant: HIMAX TECHNOLOGIES LIMITED, Tainan (TW)

(72) Inventors: Hui-Min Wang, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 195 days.

(21) Appl. No.: 15/485,223

(22) Filed: Apr. 11, 2017

(65) Prior Publication Data

US 2018/0196544 A1    Jul. 12, 2018

(30) Foreign Application Priority Data

Jan. 12, 2017 (TW) .............................. 106101055 A

(51) Int. Cl.
*G06F 3/041* (2006.01)
*G06F 3/0354* (2013.01)
*G06F 3/044* (2006.01)

(52) U.S. Cl.
CPC ........ *G06F 3/0412* (2013.01); *G06F 3/03545* (2013.01); *G06F 3/0442* (2019.05); *G06F 3/04166* (2019.05)

(58) Field of Classification Search
CPC .... G06F 3/044; G06F 3/0416; G06F 3/03545; G06F 3/0412; G06F 3/0442; G06F 3/04166
See application file for complete search history.

(56) References Cited

U.S. PATENT DOCUMENTS

| | | | |
|---|---|---|---|
| 10,761,619 B2 * | 9/2020 | Park | G06F 3/04162 |
| 2014/0062898 A1 * | 3/2014 | Singh | G06F 1/3262 345/173 |
| 2014/0078104 A1 * | 3/2014 | Lee | G06F 3/044 345/174 |
| 2015/0062459 A1 * | 3/2015 | Li | H01Q 1/44 349/12 |
| 2015/0317002 A1 | 11/2015 | King-Smith et al. | |
| 2017/0090658 A1 * | 3/2017 | Park | G06F 3/0416 |

FOREIGN PATENT DOCUMENTS

| | | |
|---|---|---|
| CN | 103424909 A | 12/2013 |
| TW | M445221 U | 1/2013 |
| TW | 201643618 A | 12/2016 |

* cited by examiner

*Primary Examiner* — Jonathan A Boyd
(74) *Attorney, Agent, or Firm* — CKC & Partners Co., LLC

(57) ABSTRACT

A touch display apparatus is provided, which includes a panel and a circuit. The panel is configured for display, active stylus sensing and touch sensing, which includes a sensing layer having sensing blocks arranged in an array of rows and columns. The circuit is coupled to the panel, and is configured to drive the panel to perform display and active stylus sensing with respect to a first reference voltage at a first stage of a frame period and to drive the panel to perform touch sensing with respect to a second reference voltage at a second stage of the frame period.

15 Claims, 10 Drawing Sheets

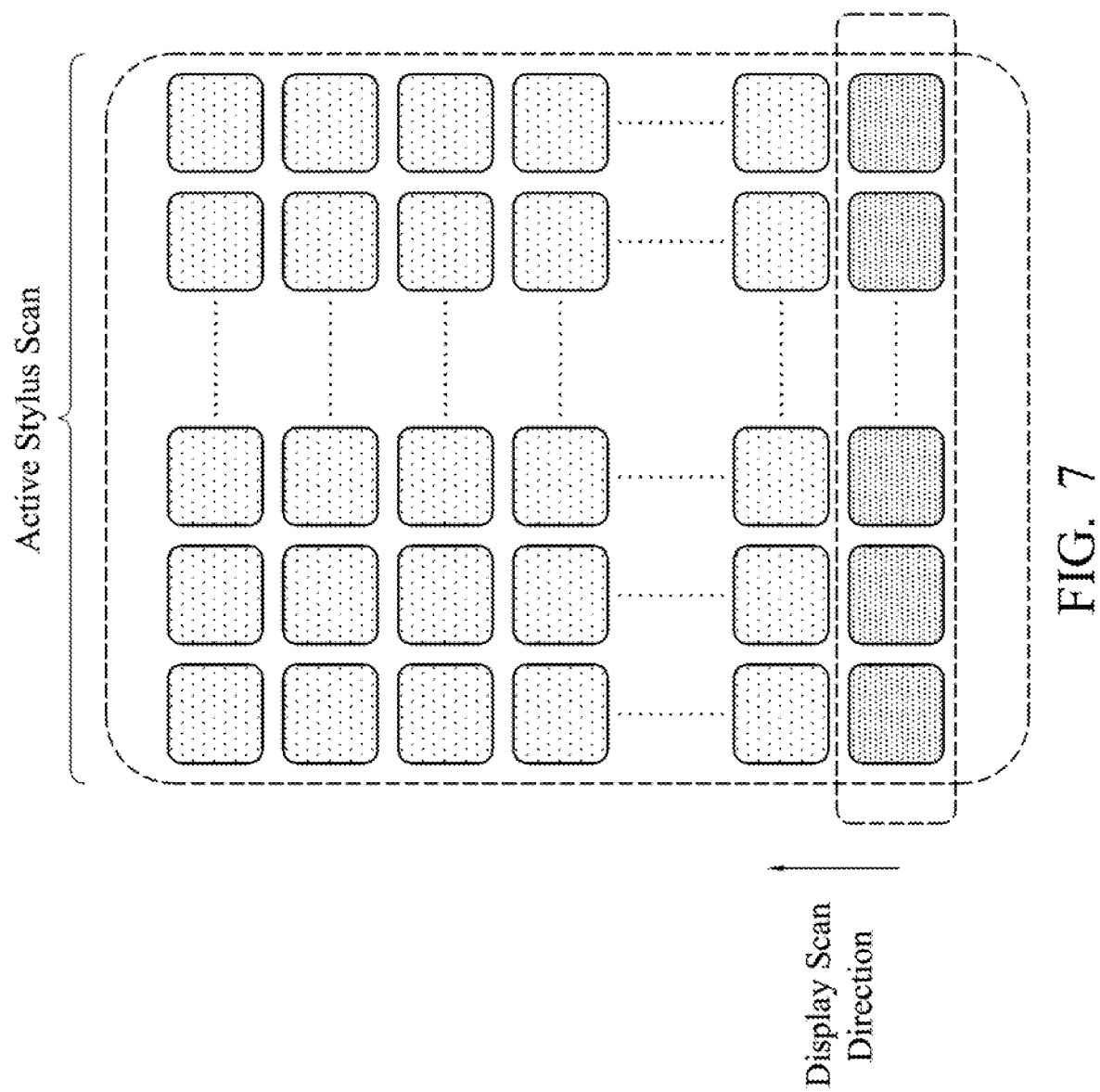

TOUCH DISPLAY APPARATUS AND METHOD FOR TOUCH DISPLAY PANEL

RELATED APPLICATIONS

This application claims priority to Taiwan Patent Application Serial Number 106101055, filed on Jan. 12, 2017, which is herein incorporated by reference.

BACKGROUND

Field of the Invention

The invention relates to a touch display, and more particularly to a touch display apparatus and method for a touch display panel.

Description of Related Art

With advance of electronic product manufacturing technologies, more and more mobile electronic devices, such as smartphones and tablets, have employed touch function for facilitating user operations. Conventionally, touch technologies applied for flat panel displays include a one glass solution (OGS) technology, an on-cell technology and an in-cell technology. Among these technologies, the in-cell technology has at least the advantage of thin design of a liquid crystal display (LCD) because touch electrodes are embedded within the cell structure. However, for an LCD with display, touch sensing as well as active stylus sensing, the display operation, the touch sensing operation and the active stylus sensing operation need to be performed at different stages of a frame period, which results in reduction of charge time and discharge time for display.

SUMMARY

An objective of the invention is to provide a touch display apparatus in which the touch operation and the active stylus sensing operation are incorporated in the same stage, so as to ensure sufficient charge time and discharge time of each pixel for display.

One aspect of the invention is directed to a touch display apparatus which includes a panel and a circuit. The panel is configured for display, active stylus sensing and touch sensing, which includes a sensing layer having sensing blocks arranged in an array of rows and columns. The circuit is coupled to the panel, and is configured to drive the panel to perform display and active stylus sensing with respect to a first reference voltage at a first stage of a frame period and to drive the panel to perform touch sensing with respect to a second reference voltage at a second stage of the frame period.

In accordance with one or more embodiments of the invention, for each of the rows of sensing blocks, the circuit includes selectors, a multiplexer and an integration unit. Each of the selectors has a first terminal coupled to one sensing block of the corresponding row of sensing blocks, a second terminal, a third terminal coupled to a first node which provides the first reference voltage and a fourth terminal coupled to a second node which provides the second reference voltage. The multiplexer is coupled to the selectors, and has a first input terminal coupled to the first node, a second input terminal coupled to the second node and an output terminal. The integration unit is coupled to the second terminal of each of the selectors and the output terminal of the multiplexer.

In accordance with one or more embodiments of the invention, the selectors which respect to the rows of sensing blocks are configured to respectively switch to connect the first terminals to the second terminals column-by-column for active stylus sensing, such that an active stylus scan direction of the panel is perpendicular to a display scan direction of the panel.

In accordance with one or more embodiments of the invention, for each of the column of sensing blocks, the circuit includes selectors, a multiplexer and an integration unit. Each of the selectors has a first terminal coupled to one sensing block of the corresponding column of sensing blocks, a second terminal, a third terminal coupled to a first node which provides the first reference voltage and a fourth terminal coupled to a second node which provides the second reference voltage. The multiplexer is coupled to the selectors, and has a first input terminal coupled to the first node, a second input terminal coupled to the second node and an output terminal. The integration unit is coupled to the second terminal of each of the selectors and the output terminal of the multiplexer.

In accordance with one or more embodiments of the invention, the selectors which respect to the columns of sensing blocks are configured to respectively switch to connect the first terminals to the second terminals row-by-row for active stylus sensing, such that an active stylus scan direction of the panel is parallel to a display scan direction of the panel.

In accordance with one or more embodiments of the invention, the circuit is configured to provide the first reference voltage to all of the sensing blocks at the same time during the first stage.

In accordance with one or more embodiments of the invention, the first stage and the second stage of the frame period are non-overlapped.

In accordance with one or more embodiments of the invention, the first reference voltage is a direct current (DC) voltage.

In accordance with one or more embodiments of the invention, the second reference voltage is an alternative current (AC) voltage.

In accordance with one or more embodiments of the invention, the panel is an in-cell touch display panel.

In accordance with one or more embodiments of the invention, the circuit is a touch and display driving integration (TDDI) circuit.

Another aspect of the invention is directed to a method for a touch display panel which is configured for display, active stylus sensing and touch sensing. In the method, a first reference voltage is applied to the touch display panel for display and active stylus sensing at a first stage of a frame period, and a second reference voltage is applied to the touch display panel for touch sensing at a second stage of the frame period.

In accordance with one or more embodiments of the invention, the first reference voltage is sequentially applied column-by-column to sensing blocks of the touch display panel arranged in an array for active stylus sensing, such that an active stylus scan direction of the touch display panel is perpendicular to a display scan direction of the touch display panel.

In accordance with one or more embodiments of the invention, the first reference voltage is sequentially applied row-by-row to sensing blocks of the touch display panel touch arranged in an array for active stylus sensing, such that an active stylus scan direction of the touch display panel is parallel to a display scan direction of the touch display panel.

In accordance with one or more embodiments of the invention, the first reference voltage is applied to all sensing blocks of the touch display panel at the same time during the first stage.

In accordance with one or more embodiments of the invention, the first stage and the second stage are non-overlapped.

In accordance with one or more embodiments of the invention, the first reference voltage applied to the touch display panel is a DC voltage.

In accordance with one or more embodiments of the invention, the second reference voltage applied to the touch display panel is an AC voltage.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings.

Figure 1A:
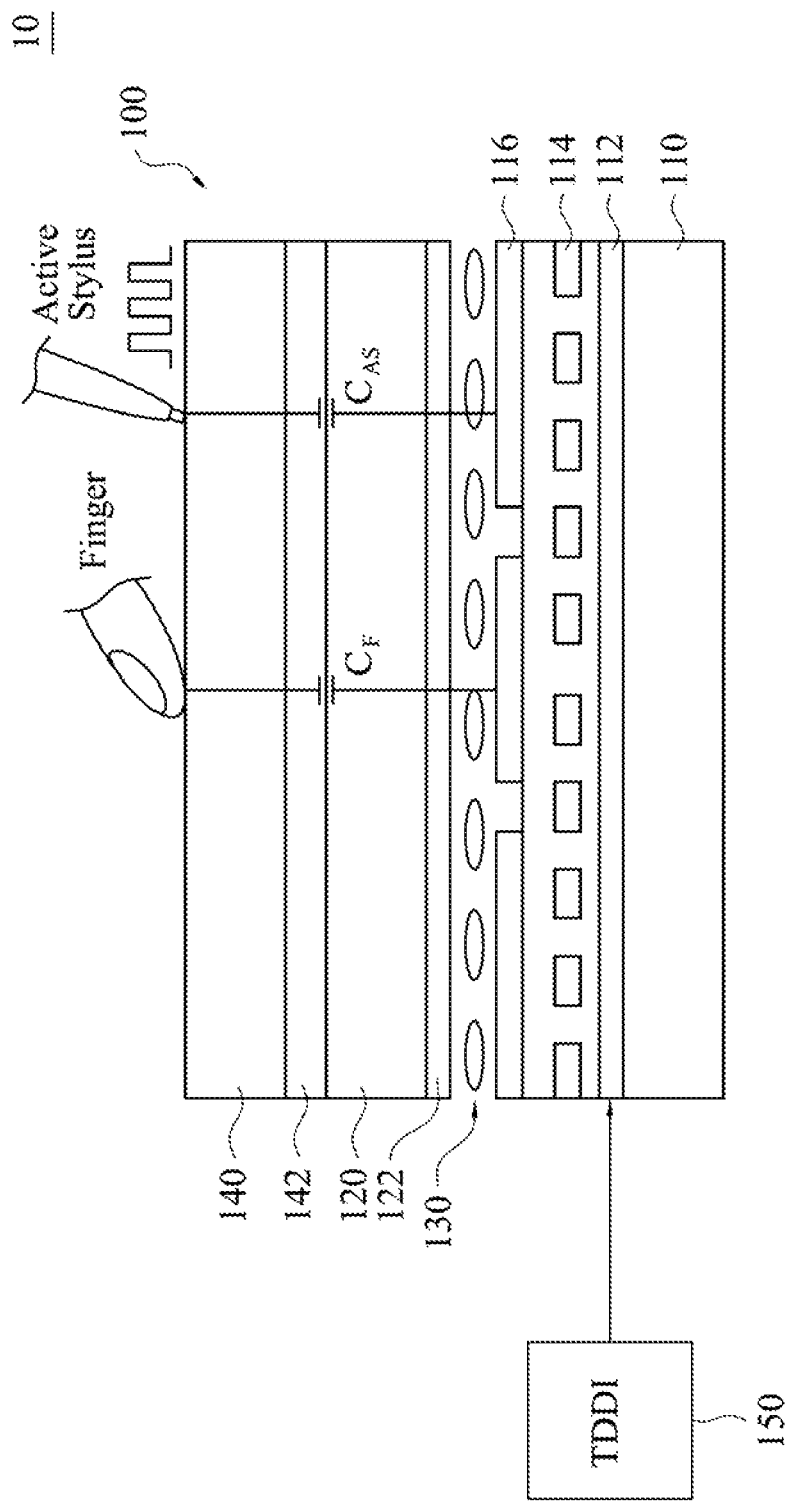
FIG. 1A is a schematic cross sectional view of a touch display apparatus in accordance with some embodiments of the invention.

FIG. B is a schematic view of sensing blocks of the sensing layer in FIG. 1A in accordance with some embodiments of the invention.

Figure 2:
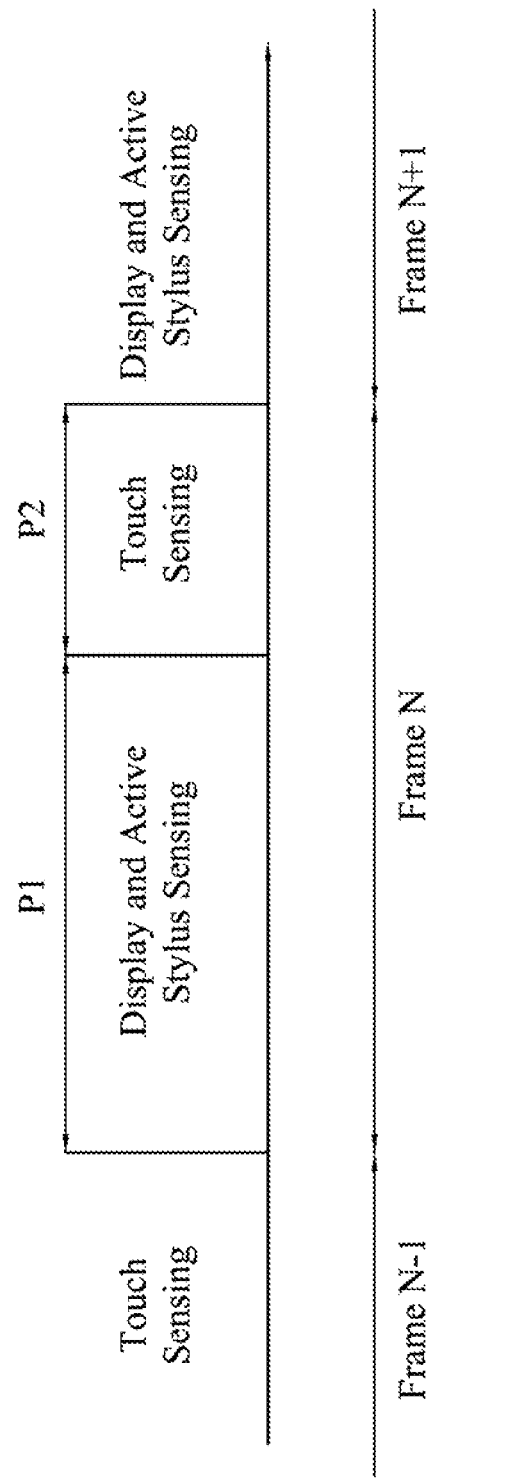

FIG. 2 is a schematic diagram showing a time sequence of operation of the touch display panel of FIG. 1A in accordance with some embodiments of the invention.

Figure 3A:
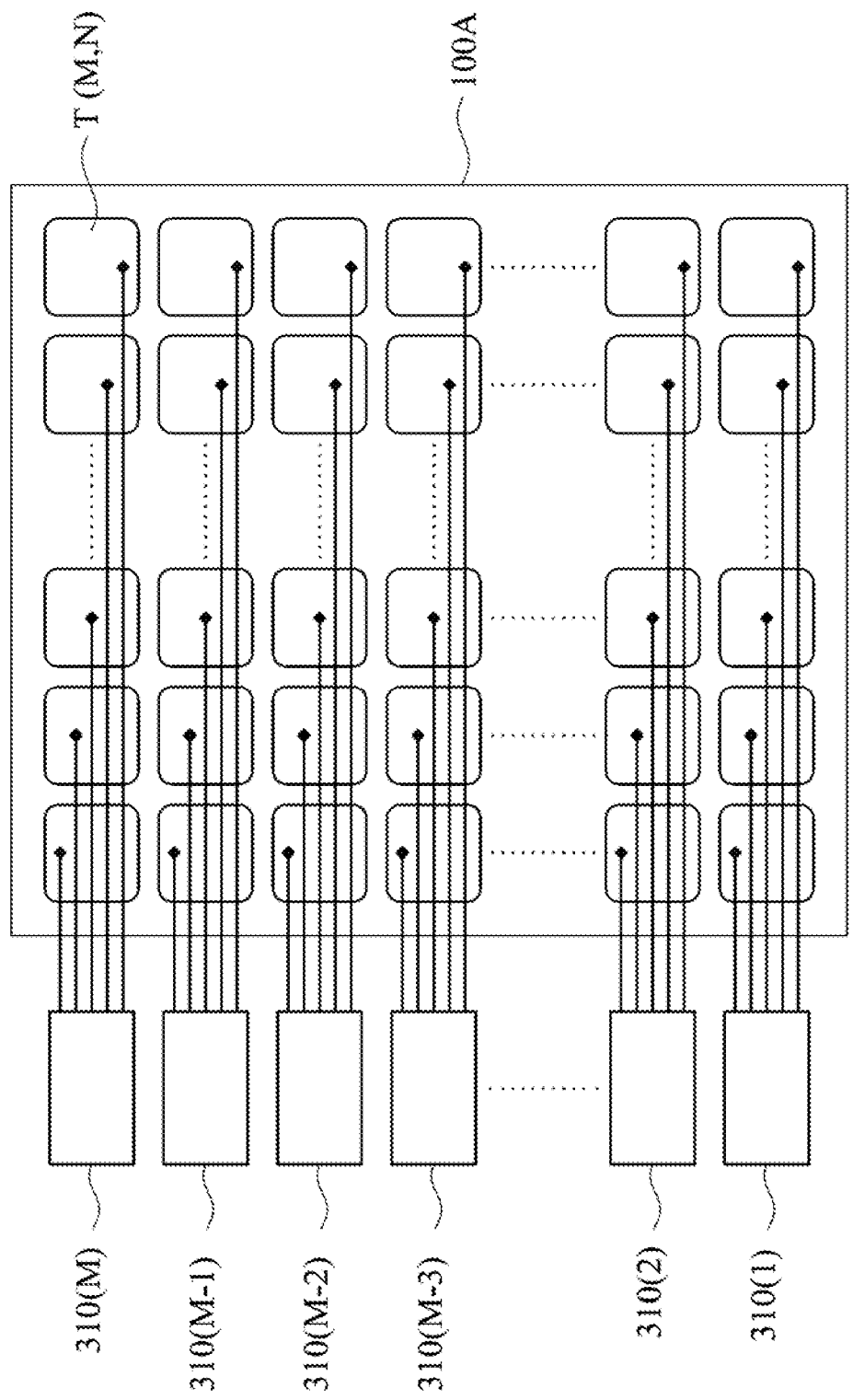
Figure 3B:
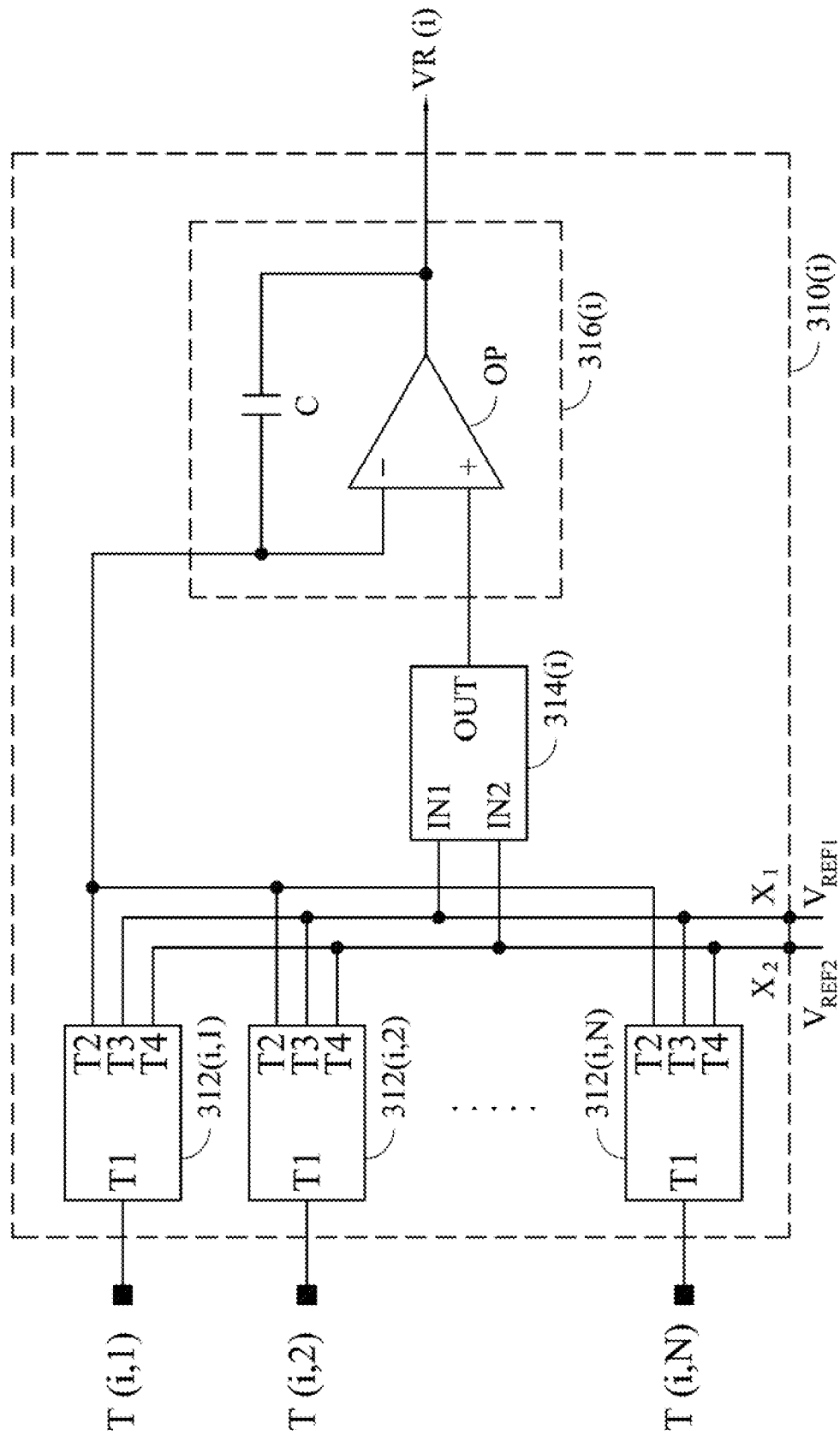

FIG. 3A and FIG. 3B illustrate a portion of the TDDI circuit in FIG. 1A in accordance with some embodiments of the invention.

Figure 4:
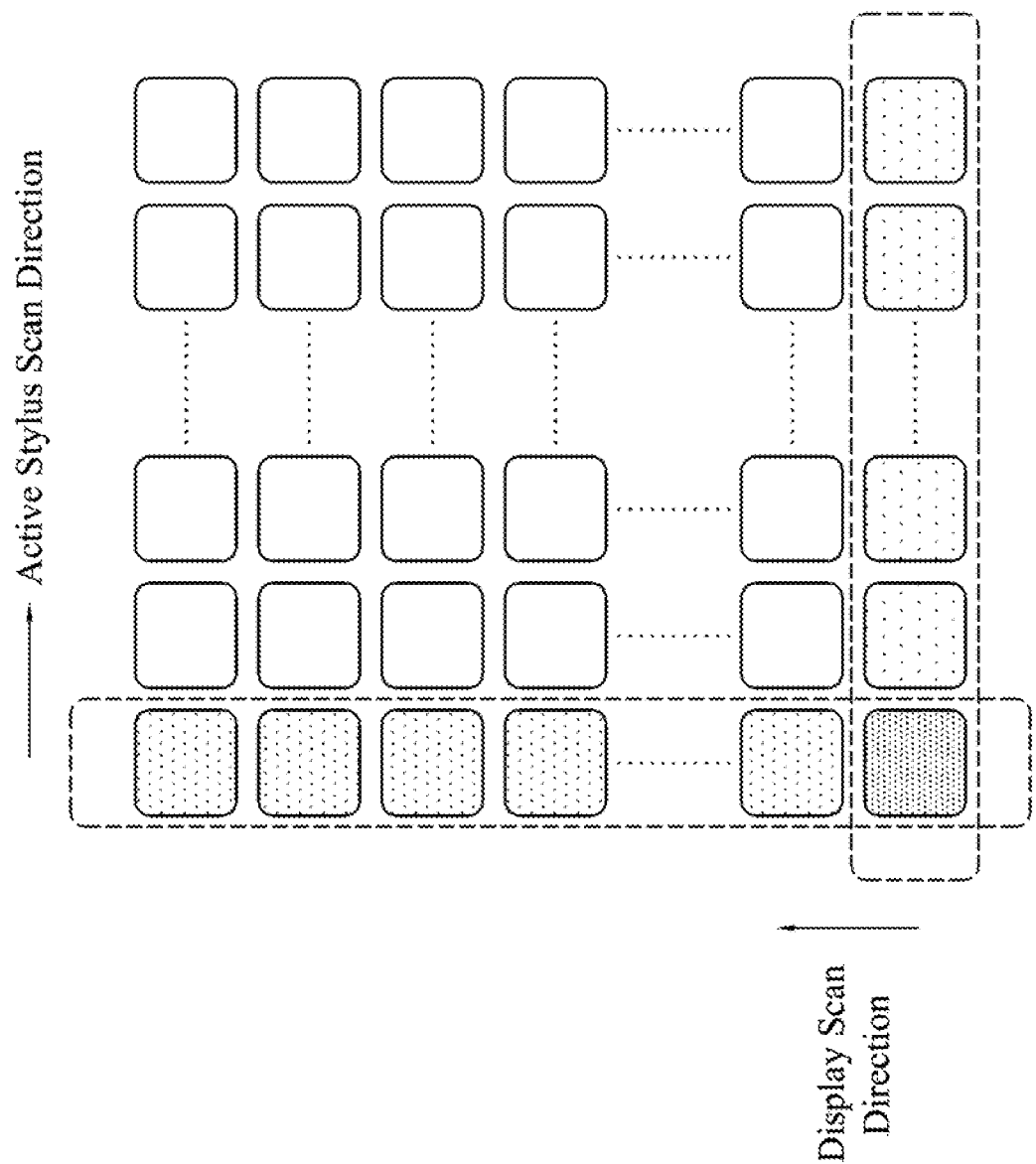

FIG. 4 illustratively shows display scan direction and active stylus scan direction of the touch display panel in accordance with some embodiments of the invention.

Figure 5A:
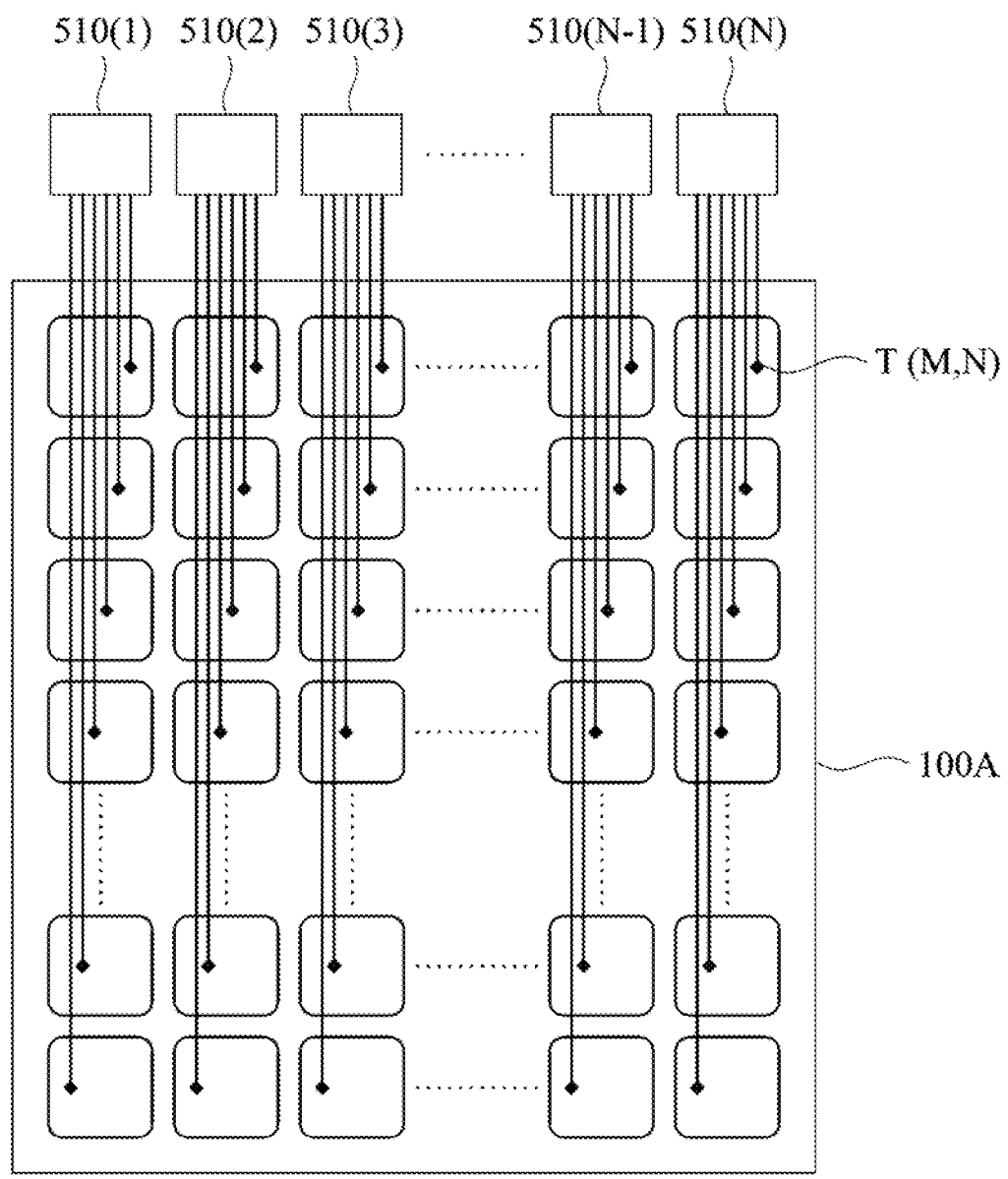
Figure 5B:
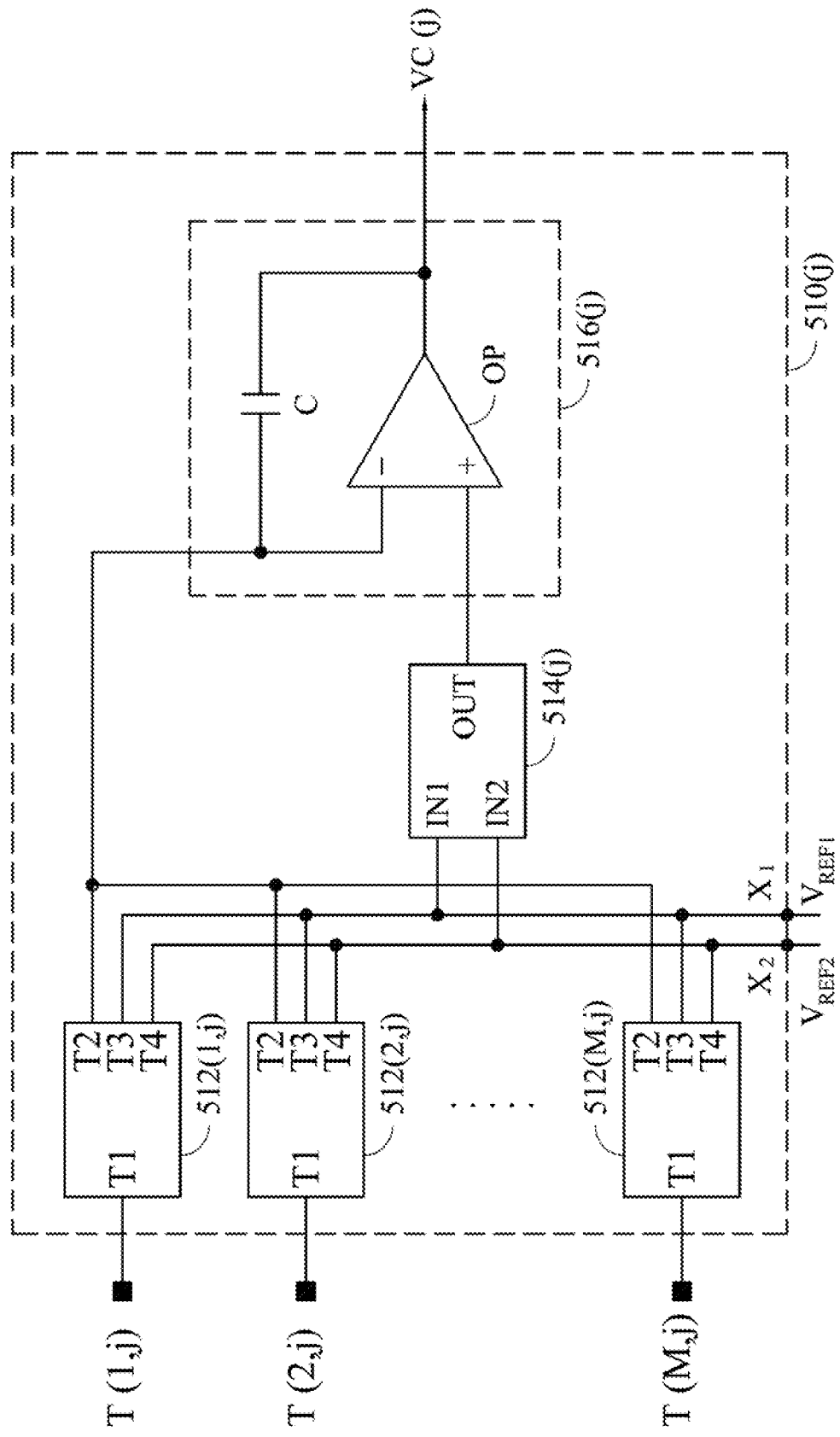

FIG. 5A and FIG. 5B illustrate a portion of the TDDI circuit in FIG. 1A in accordance with some embodiments of the invention.

Figure 6:
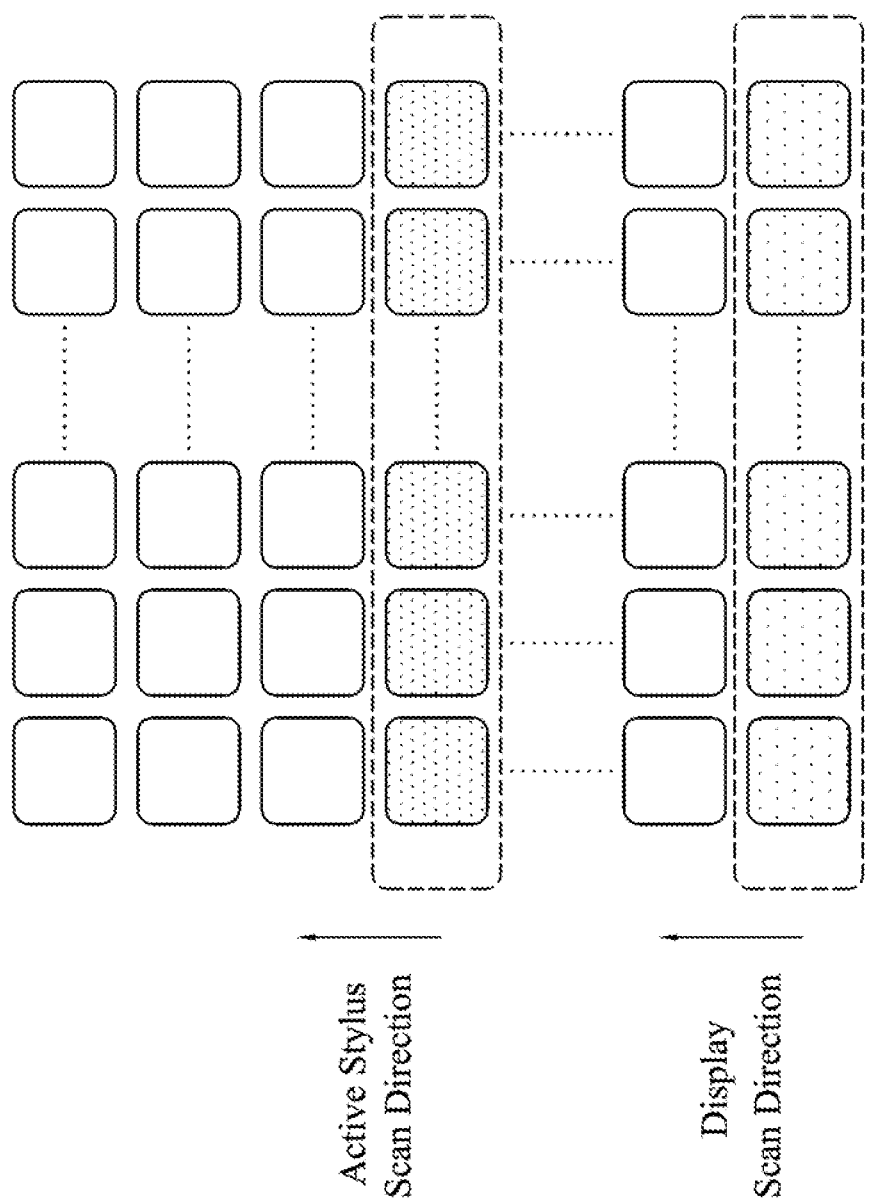

FIG. 6 illustratively shows display scan direction and active stylus scan direction of the touch display panel in accordance with some embodiments of the invention.

FIG. 7 illustratively shows display scan direction and active stylus scan of the touch display panel in accordance with some embodiments of the invention.

DETAILED DESCRIPTION

The detailed explanation of the invention is described as following. The described preferred embodiments are presented for purposes of illustrations and description, and they are not intended to limit the scope of the invention.

It will be understood that, although the terms "first", "second", "third" and "fourth" may be used herein to describe various elements, components, stages, and/or signals, these elements, components, stages, and/or signals should not be limited by these terms. These terms are only used to distinguish elements, components, stages, and/or signals.

In the following description and claims, the term "coupled" along with their derivatives, may be used. In particular embodiments, "coupled" may be used to indicate that two or more elements are in direct physical or electrical contact with each other, or may also mean that two or more elements may not be in direct contact with each other. "Coupled" may still be used to indicate that two or more elements cooperate or interact with each other.

Referring to FIG. 1A, FIG. 1A is a schematic cross-sectional view of a touch display apparatus 10 in accordance with some embodiments of the invention. The touch display apparatus 10 includes a touch display panel 100 and a touch and display driving integration (TDDI) circuit 150 configured to drive the touch display panel 100 to perform display, active stylus sensing and touch sensing. The touch display panel 100 is an in-cell type touch display panel, and in the touch display panel 100, a thin-film transistor (TFT) substrate 110 and a color filter (CF) substrate 120 are oppositely disposed, and a liquid crystal layer 130 is disposed between the TFT substrate 110 and the CF substrate 120. Scan lines 112, data lines 114, pixel TFTs (not shown) and pixel electrodes (i.e. of a sensing layer 116) are disposed on the TFT substrate 110 for display. The sensing layer 116 is also used for active stylus sensing (i.e. detection of touch by an active stylus which generates a pulse signal with a specific frequency) and touch sensing (e.g. detection of touch by a finger or another limb of a person). A color filter layer 122 is disposed on the CF substrate 120, and has color filter units each corresponding to one of pixels of the touch display panel 100 for passing light with a specific color. A cover substrate 140 adheres to the CF substrate 120 via an adhesive layer 142 therebetween for providing at least protection function and a touch operation interface. As shown in FIG. 1, a capacitance $C_F$ is measured when a person's finger touches the surface of the cover substrate 140, and a capacitance $C_{AS}$ is measured when an active stylus touches the surface of the cover substrate 140. In another embodiment, the display driving integration (TDDI) circuit 150 may be replaced by several circuits which collectively perform display driving, active stylus sensing driving as well as touch driving on the touch display panel 100.

Figure 1B:
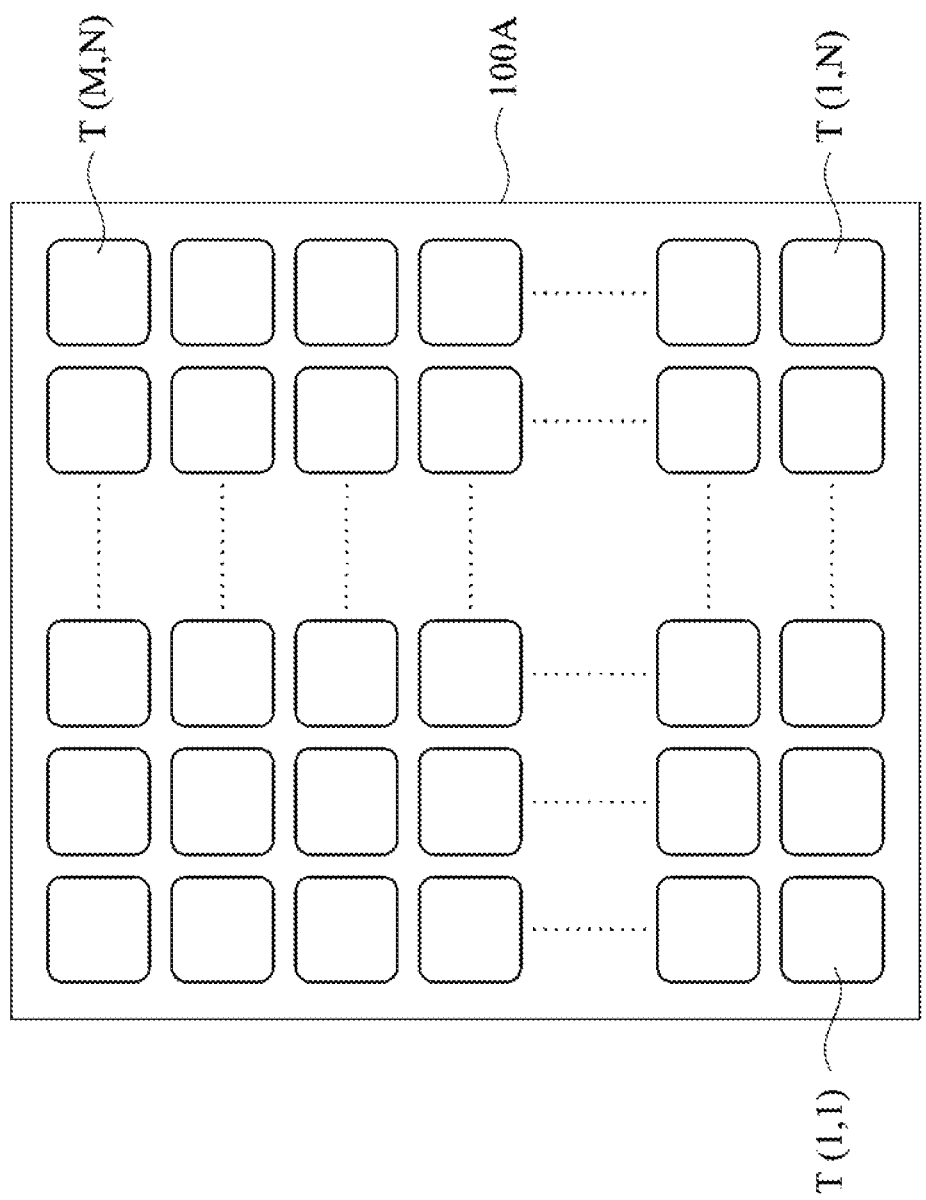

FIG. 1B is a schematic view of sensing blocks $T(1,1)$-$T(M,N)$ of the sensing layer 116 in accordance with some embodiments of the invention. As shown in FIG. 1B, the sensing blocks $T(1,1)$-$T(M,N)$ are arranged in a display and sensing area 100A of the touch display panel 100 in a form of M×N array.

FIG. 2 is a schematic diagram showing a time sequence of operation of the touch display panel 100 in accordance with some embodiments of the invention. Each frame period of the touch display panel 100 includes a display and active stylus sensing stage P1 and a touch sensing stage P2. The display and active stylus sensing stage P1 and the touch sensing stage P2 may be non-overlapped. In the display and active stylus sensing stage P1, the TDDI circuit 150 applies a first reference voltage $V_{REF1}$ to the touch display panel 100 for display and active stylus sensing. Then, in the touch sensing stage P2, the TDDI circuit 150 applies a second reference voltage $V_{REF2}$ to the touch display panel 100 for touch sensing. The first reference voltage $V_{REF1}$ applied to the touch display panel 100 during the display and active stylus sensing stage P1 may be a direct current (DC) voltage, and the second reference voltage $V_{REF2}$ applied to the touch display panel 100 during the touch sensing stage P2 may be an alternate current (AC) voltage with a sinusoidal waveform, a triangle waveform, a sawtooth waveform, a trapezoidal waveform, or the like.

Referring to FIG. 3A, which illustrates a portion of the TDDI circuit 150 in accordance with some embodiments of the invention. In FIG. 3A, circuits 310(1)-310(M) of the TDDI circuit 150 are electrically connected to the rows of the sensing blocks $T(1,1)$-$T(M,N)$ in the display and sensing area 100A, respectively. That is, the circuit 310(*i*) (i is an integer of 1 to M) of the TDDI circuit 150 is electrically connected to the sensing blocks T(i,1)-T(i,N). Also referring to FIG. 3B, the circuit 310(*i*) includes selectors 312(*i*,1)-312(*i*,N), a multiplexer 314(*i*) and an integration unit 316(*i*). The first terminals T1 of the selectors 312(*i*,1)-312(*i*,N) are coupled to the sensing blocks T(i,1)-T(i,N), respectively. The second terminals T2 of the selectors 312(*i*,1)-312(*i*,N) are coupled to the integration unit 316(*i*). The third terminals T3 of the selectors 312(*i*,1)-312(*i*,N) are coupled to the node X1 which provides the first reference voltage $V_{REF1}$, and the fourth terminals T4 of the selectors 312(*i*,1)-312(*i*,N) are coupled to the node X2 which provides the second reference voltage $V_{REF2}$. Details of the operations of the selectors 312(*i*,1)-312(*i*,N) will be described below in connection with FIG. 4 and FIG. 7.

The multiplexer 314(*i*) is configured to couple which of the nodes X1 and X2 to the integration unit 316(*i*). When the touch display panel 100 is operated in the display and active stylus sensing stage P1, the multiplexer 314(*i*) switches to connect the first input terminal IN1 to the output terminal OUT for coupling the node X1 to the integration unit 316(*i*). Oppositely, when the touch display panel 100 is operated in the touch sensing stage P2, the multiplexer 314(*i*) switches to connect the second input terminal IN2 to the output terminal OUT for coupling the node X2 to the integration unit 316(*i*).

The integration unit 316(*i*) includes an operational amplifier OP and a capacitor C. The positive input terminal of the operational amplifier OP is coupled to the output terminal of the multiplexer 314(*i*), the negative input terminal of the operational amplifier OP is coupled to the second terminals T2 of the selectors 312(*i*,1)-312(*i*,N), and the output terminal of the operational amplifier OP is configured for outputting a voltage signal VR(i). The two terminals of the capacitor C are coupled to the negative input terminal and the output terminal of the operational amplifier OP, respectively. An analog-to-digital converter (not shown) may be configured to convert the voltage signals VR(1)-VR(M) into touch data (including active stylus sensing information and/or touch sensing information).

Also referring to FIG. 4, in some embodiments, the display scan direction of the touch display panel 100 is perpendicular to the active stylus scan direction of the touch display panel 100. In such case, the selectors 312(1,1)-312(M,N) are configured to respectively switch to connect the first terminals T1 to the second terminals T2 column-by-column; that is, the sensing blocks T(1,1)-T(M,N) are scanned column-by-column for active stylus sensing.

For illustration, when the n-th column (1<n<N) of the array starts to be scanned for active stylus sensing during the display and active stylus sensing stage P1, the selectors 312(1,*n*)-312(M,n) switch to electrically connect the sensing blocks T(1,*n*)-T(M,n) to the integration units 316(1)-316(M), respectively, and the other selectors 312(1,1)-312(M, n−1) and 312(1,*n*+1)-312(M,N) switch to electrically connect the sensing blocks T(1,1)-T(M,n−1) and T(1,*n*+1)-T(M, N) to the node X1, respectively; when the n-th column of the array starts to be scanned for touch sensing during the touch sensing stage P2, the selectors 312(1,*n*)-312(M,n) switch to electrically connect the sensing blocks T(1,*n*)-T(M,n) to the integration units 316(1)-316(M), respectively, and the other selectors 312(1,1)-312(M,n−1) and 312(1,*n*+1)-312(M,N) switch to electrically connect the sensing blocks T(1,1)-T (M,n−1) and T(1,*n*+1)-T(M,N) to the node X2, respectively.

Referring to FIG. 5A, which illustrates a portion of the TDDI circuit 150 in accordance with some embodiments of the invention. In FIG. 5A, circuits 510(1)-510(N) of the TDDI circuit 150 are electrically connected to the columns of the sensing blocks T(1,1)-T(M,N) in the display and sensing area 100A, respectively. That is, the circuit 510(*j*) (j is an integer of 1 to N) of the TDDI circuit 150 is electrically connected to the sensing blocks T(1,*j*)-T(M,j). Also referring to FIG. 5B, the circuit 510(*j*) (j is an integer of 1 to N) includes selectors 512(1,*j*)-512(M,j), a multiplexer 514(*j*) and an integration unit 516(*j*). The first terminals T1 of the selectors 512(1,*j*)-512(M,j) are coupled to the sensing blocks T(1,*j*)-T(M,j), respectively. The second terminals T2 of the selectors 512(1*j*)-512(M,j) are coupled to the integration unit 516(*j*). The third terminals T3 of the selectors 512(1, *j*)-512(M,j) are coupled to the node X1 which provides the first reference voltage $V_{REF1}$, and the fourth terminals T4 of the selectors 512(1,*j*)-512(M,j) are coupled to the node X2 which provides the second reference voltage $V_{REF2}$. Details of the operations of the selectors 512(1*j*)-512(M,j) will be described below in connection with FIG. 6 and FIG. 7.

The multiplexer 514(*j*) is configured to couple which of the nodes X1 and X2 to the integration unit 516(*j*). When the touch display panel 100 is operated in the display and active stylus sensing stage P1, the multiplexer 514(*j*) switches to connect the first input terminal IN1 to the output terminal OUT for coupling the node X1 to the integration unit 516(*j*). Oppositely, when the touch display panel 100 is operated in the touch sensing stage P2, the multiplexer 514(*j*) switches to connect the second input terminal IN2 to the output terminal OUT for coupling the node X2 to the integration unit 516(*j*).

The integration unit 516(*j*) includes an operational amplifier OP and a capacitor C. The positive input terminal of the operational amplifier OP is coupled to the output terminal of the multiplexer 514(*j*), the negative input terminal of the operational amplifier OP is coupled to the second terminals T2 of the selectors 512(1,*j*)-512(M,j), and the output terminal of the operational amplifier OP is configured for outputting a voltage signal VC(j). Two terminals of the capacitor C are coupled to the negative input terminal and the output terminal of the operational amplifier OP, respectively. An analog-to-digital converter (not shown) may be configured to convert the voltage signals VC(1)-VC(N) into touch data (including active stylus sensing information and/or touch sensing information).

Also referring to FIG. 6, in some embodiments, the display scan direction of the touch display panel 100 is parallel to the active stylus scan direction of the touch display panel 100. In such case, the selectors 512(1,1)-512 (M,N) are configured to respectively switch to connect the first terminals T1 to the second terminals T2 row-by-row; that is, the sensing blocks T(1,1)-T(M,N) are scanned row-by-row for active stylus sensing. For illustration, when the m-th row (1<m<M) of the array starts to be scanned for active stylus sensing during the display and active stylus sensing stage P1, the selectors 512(*m*,1)-512(*m*,N) switch to electrically connect the sensing blocks T(m,1)-T(m,N) to the integration units 516(1)-516(N), respectively, and the other selectors 512(1,1)-512(*m*-1,N) and 512(*m*+1,1)-512(M,N) switch to electrically connect the sensing blocks T(1,1)-T (m−1,N) and T(m+1,1)-T(M,N) to the node X1, respectively; when the m-th row of the array starts to be scanned for touch sensing during the touch sensing stage P2, the selectors 512(*m*,1)-512(*m*,N) switch to electrically connect the sensing blocks T(m,1)-T(m,N) to the integration units 516(1)-516(N), respectively, and the other selectors 512(1, 1)-512(*m*-1,N) and 512(*m*+1,1)-512(M,N) switch to electrically connect the sensing blocks T(1,1)-T(m−1,N) and T(m+1,1)-T(M,N) to the node X2, respectively.

In alternative embodiments, as shown in FIG. 7, the sensing blocks T(1,1)-T(M,N) of the touch display panel 100 are simultaneously scanned for active stylus sensing. In such case, each the selectors 312(1,1)-312(M,N) is configured to switch to connect the first terminal T1 to the second terminal T2 for the embodiments of FIGS. 3A and 3B, or each the selectors 512(1,1)-512(M,N) is configured to switch to connect the first terminal T1 to the second terminal T2 for the embodiments of FIGS. 5A and 5B.

According to the embodiments of the invention described above, the display operation and the active stylus sensing operation are incorporated in the same stage, and thus the charge time and discharge time of each pixel are increased, thereby ensuring sufficient charge time and discharge time for display.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims.

What is claimed is:
1. A touch display apparatus, comprising:
   an in-cell touch display panel configured for display, capacitive active stylus sensing and touch sensing, wherein the in-cell touch display panel comprises:
      a thin-film transistor (TFT) substrate, the TFT substrate having a sensing layer disposed thereon, the sensing layer having a plurality of sensing blocks arranged in an array of a plurality of rows and a plurality of columns;
      a cover substrate disposed opposite to the TFT substrate, the cover substrate configured to provide a protection function and a touch operation interface for a touch operation or an active stylus operation;
      a color filter (CF) substrate interposed between the TFT substrate and the cover substrate, the color filter substrate having a CF layer disposed thereon; and
      a liquid crystal (LC) layer interposed between the sensing layer and the CF layer; and
   a circuit coupled to the in-cell touch display panel, wherein the circuit is configured to drive the in-cell touch display panel to perform display and capacitive active stylus sensing of a touch event of an active status by applying a first reference voltage to the sensing blocks at a first stage of a frame period and to drive the in-cell touch display panel to perform touch sensing by applying a second reference voltage to the sensing blocks at a second stage of the frame period, wherein the first reference voltage is a direct current (DC) voltage, and wherein the active stylus generates a pulse signal with a specific frequency for capacitive active stylus sensing.
2. The touch display apparatus of claim 1, wherein for each of the rows of sensing blocks, the circuit comprises:
   a plurality of selectors, each of the selectors having a first terminal coupled to one sensing block of the corresponding row of sensing blocks, a second terminal, a third terminal coupled to a first node which provides the first reference voltage and a fourth terminal coupled to a second node which provides the second reference voltage;
   a multiplexer coupled to the selectors, the multiplexer having a first input terminal coupled to the first node, a second input terminal coupled to the second node and an output terminal; and
   an integration unit coupled to the second terminal of each of the selectors and the output terminal of the multiplexer.
3. The touch display apparatus of claim 2, wherein the selectors which respect to the rows of sensing blocks are configured to respectively switch to connect the first terminals to the second terminals column-by-column for capacitive active stylus sensing, such that an active stylus scan direction of the in-cell touch display panel is perpendicular to a display scan direction of the in-cell touch display panel.
4. The touch display apparatus of claim 1, wherein for each of the columns of sensing blocks, the circuit comprises:
   a plurality of selectors, each of the selectors having a first terminal coupled to one sensing block of the corresponding column of sensing blocks, a second terminal, a third terminal coupled to a first node which provides the first reference voltage and a fourth terminal coupled to a second node which provides the second reference voltage;
   a multiplexer coupled to the selectors, the multiplexer having a first input terminal coupled to the first node, a second input terminal coupled to the second node and an output terminal; and
   an integration unit coupled to the second terminal of each of the selectors and the output terminal of the multiplexer.
5. The touch display apparatus of claim 4, wherein the selectors which respect to the columns of sensing blocks are configured to respectively switch to connect the first terminals to the second terminals row-by-row for capacitive active stylus sensing, such that an active stylus scan direction of the in-cell touch display panel is parallel to a display scan direction of the in-cell touch display panel.
6. The touch display apparatus of claim 1, wherein the circuit is configured to apply the first reference voltage to all of the sensing blocks at the same time during the first stage.
7. The touch display apparatus of claim 1, wherein the first stage and the second stage of the frame period are non-overlapped.
8. The touch display apparatus of claim 1, wherein the second reference voltage is an alternative current (AC) voltage.
9. The touch display apparatus of claim 1, wherein the circuit is a touch and display driving integration (TDDI) circuit.
10. A method for an in-cell touch display panel configured for display, capacitive active stylus sensing and touch sensing, the in-cell touch display panel having a touch surface for a touch operation, a sensing layer and a liquid crystal (LC) layer interposed between the touch surface and the sensing layer, the sensing layer having a plurality of sensing blocks arranged in an array, and the method comprising:
   applying a first reference voltage to the sensing layer for display and capacitive active stylus sensing of a touch event of an active stylus at a first stage of a frame period; and
   applying a second reference voltage to the sensing layer for touch sensing at a second stage of the frame period;
   wherein the first reference voltage is a direct current (CD) voltage, and wherein the active stylus generates a pulse signal with a specific frequency for capacitive active stylus sensing.

11. The method of claim 10, wherein the first reference voltage is sequentially applied column-by-column to the sensing blocks of the sensing layer arranged in an array for capacitive active stylus sensing, such that an active stylus scan direction of the in-cell touch display panel is perpendicular to a display scan direction of the in-cell touch display panel.

12. The method of claim 10, wherein the first reference voltage is sequentially applied row-by-row to the sensing blocks of the sensing layer arranged in an array for capacitive active stylus sensing, such that an active stylus scan direction of the in-cell touch display panel is parallel to a display scan direction of the in-cell touch display panel.

13. The method of claim 10, wherein the first reference voltage is applied to all sensing blocks of the sensing layer at the same time during the first stage.

14. The method of claim 10, wherein the first stage and the second stage are non-overlapped.

15. The method of claim 10, wherein the second reference voltage applied to the in-cell touch display panel is an AC voltage.

\* \* \* \* \*